United States Patent
Wedding

(10) Patent No.: US 7,466,765 B2
(45) Date of Patent: Dec. 16, 2008

(54) RECEIVER FOR HIGH BITRATE BINARY SIGNALS

(75) Inventor: Berthold Wedding, Korntal-Münchingen (DE)

(73) Assignee: ALCATEL, Paris (FR)

( * ) Notice: Subject to any disclaimer, the term of this patent is extended or adjusted under 35 U.S.C. 154(b) by 1234 days.

(21) Appl. No.: 10/207,862

(22) Filed: Jul. 31, 2002

(65) Prior Publication Data

US 2003/0048859 A1 Mar. 13, 2003

(30) Foreign Application Priority Data

Sep. 10, 2001 (EP) .................................. 01440292

(51) Int. Cl.
*H04L 25/06* (2006.01)
*H04L 25/10* (2006.01)

(52) U.S. Cl. ........................ 375/317; 375/286; 375/287; 375/340

(58) Field of Classification Search .......... 375/229–234, 375/317, 316, 286–287, 340; 398/45, 81, 398/141, 149, 151, 205, 209
See application file for complete search history.

(56) References Cited

U.S. PATENT DOCUMENTS

| | | | | |
|---|---|---|---|---|
| 4,404,674 A | * | 9/1983 | Rhodes | ........................ 714/793 |
| 5,319,649 A | * | 6/1994 | Raghavan et al. | ........... 714/780 |
| 5,510,919 A | * | 4/1996 | Wedding | ..................... 398/141 |
| 5,617,083 A | * | 4/1997 | Schwendeman et al. | ... 340/7.43 |
| 5,777,511 A | * | 7/1998 | Masumoto et al. | .......... 329/304 |
| 5,920,599 A | | 7/1999 | Igarashi | |
| 6,256,342 B1 | * | 7/2001 | Schlag et al. | ................ 375/229 |
| 6,295,152 B1 | * | 9/2001 | Wedding | ..................... 398/209 |
| 2001/0019522 A1 | * | 9/2001 | Mita et al. | ................ 369/47.19 |

FOREIGN PATENT DOCUMENTS

| | | |
|---|---|---|
| DE | 923204 A2 * | 6/1999 |
| EP | 0 455 910 A3 | 11/1991 |
| EP | 0 656 700 A1 | 6/1995 |
| EP | 0 912 020 A2 | 4/1999 |
| EP | 0 923 204 A2 | 6/1999 |
| EP | 0 966 117 A1 | 12/1999 |

OTHER PUBLICATIONS

B. Wedding et al.: "Multi-Level Dispersion Supported Transmission at 20 Gbit/s over 46 km Installed Standard Single Mode Fiber", Proceedings of ECOC 1996, Oslo, MoB.4.4, pp. 1.91-1.94.
J. Hauenschild et al.: "Demonstration of Retiming Capability of Silicon Bipolar Time-Division Multiplexer Operating to 24 Gbit/s", Electronics Letters vol. 27, No. 11, pp. 978-979, May 23, 1991.

* cited by examiner

*Primary Examiner*—Curtis B Odom
(74) *Attorney, Agent, or Firm*—Sughrue Mion, PLLC

(57) ABSTRACT

A receiver for high bitrate binary signals contains a soft decision circuit with three parallel deciders coupled to a 2:1 multiplexer. The three deciders have different threshold values and generate four potential states. The 2:1 multiplexer translates the four different states into a restored data signal and a reliability signal indicating the decision reliability.

8 Claims, 2 Drawing Sheets

RECEIVER FOR HIGH BITRATE BINARY SIGNALS

FIELD OF THE INVENTION

The invention relates to the field of telecommunications and more particularly to a receiver for a high bitrate binary signal.

BACKGROUND OF THE INVENTION

In data transmission, especially at high bitrate, data decision is a crucial aspect, i.e., to decide for each bit of a received transmission signal on whether the bit content is logical 1 or logical 0. The reason for this being that due to linear and non-linear effects on the transmission path, the received signal is distorted and needs to be restored to an ideal binary signal with steep rising edges. This is especially true for optical binary signals which are subject to dispersion on the transmission path and which need to be converted from optical to electrical and then electrically restored.

Typically, data decision is performed with a decider which compares the signal level of each successive bit with a threshold value. The bit contains logical 1 if the signal level exceeds the threshold and logical 0 otherwise. A problem is that data decision near the threshold value may be defective.

An improved decider circuit known from EP 0 923 204 contains in addition a pseudo-error monitor which controls the threshold value of the decider.

Another decider circuit known from EP 0 912 020 contains three parallel deciders coupled to a multiplexer. The output of the multiplexer is fed to several delay elements which couple back to the multiplexer. This decider circuit serves to compensate for differences in propagation time delay of different signal constituents at different polarization modes of a received optical signal due to polarization mode dispersion.

A special receiver for four-level optical signals is known from EP 0 656 700. A four-level optical signal contains data symbols at different amplitude levels, each symbol representing two data bits. The O/E converted signal is fed in parallel to three deciders each having a different threshold value. The output of the three deciders is fed to a multiplexer which translates the four possible states into the two bits contained therein. The decider and multiplexer thus serves to convert the multi-level signal back into a binary signal. The bitrate of the converted binary signal is twice the symbol rate of the received optical signal. This receiver and corresponding method has also been reported at the ECOC 1996 (see B. Wedding et al, "Multi-Level Dispersion Supported Transmission at 20 Gbit/s over 46 km Installed Standard Single Mode Fiber", Proceedings of ECOC 1996, Oslo, MoB.4.4, pp.1.91-1.94).

In transmission systems at high bitrate of 10 Gbit/s or even 40 Gbit/s, it is crucial to increase the sensitivity of optical receivers. This is especially true for submarine transmission systems or for transmission systems with a reduced number of regenerators on the signal path.

SUMMARY OF THE INVENTION

It is therefore an object of the present invention, to provide a receiver and decision circuit having increased sensitivity.

This object is achieved by a receiver and soft decision circuit with three parallel deciders coupled to a 2:1 multiplexer. The three deciders have different threshold values and generate four potential states. The 2:1 multiplexer translates the four different states into a restored data signal and a reliability signal indicating the decision reliability.

In an advantageous development of the invention, a fourth decision circuit is provided which output signal is compared to the restored data signal using an EXOR function to generate a pseudo error signal that is used to adjust threshold and/or clock phase of the deciders.

Other advantageous developments are defined in the dependent claims.

An advantage of the present invention is that the decision circuit can be fully integrated, e.g., as a SiGe chip for 10 Gbit/s application.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
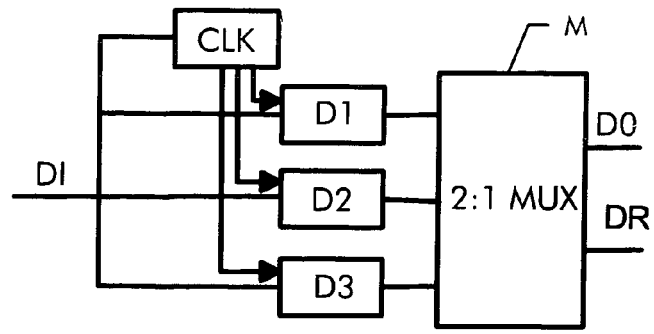
FIG. 1 shows a block diagram of a first decision circuit according to the present invention.

The principle of a soft decision circuit according to the present invention is shown in FIG. 1. A data input DI is connected to three parallel deciders D1, D2, D3. The outputs of the deciders are connected to a 2:1 multiplexer M. One output of the multiplexer M is the data output DO for the restored data signal, the other output is the output DR for the reliability signal. The data input DI is also coupled to a clock recovery circuit CLK, which derives a recovered clock signal from the received signal and supplies the deciders D1-D3 with the recovered clock. The deciders may be simple D-flip-flops or any other kind of clocked signal amplitude comparator.

Each of the three deciders has a different threshold value for comparison with the signal level of the received signal at each clock cycle. The threshold value of the second decider D2 is lower than the threshold value of the fist decider D1 but higher than the threshold value of the third decider D3. Thus, four potential states can occur:

(1) below threshold of D3 (000),
(2) below threshold of D2 but above threshold of D3 (001)
(3) below threshold of D1 but above threshold of D2 (011), or
(4) above threshold of D1 (111).

The 2:1 multiplexer decodes these four potential states into the following corresponding two-bit representations:

(1) 000=01,
(2) 001=00,
(3) 011=10, or
(4) 111=11.

The most significant bit is used as the restored data signal DO while the least significant bit represents the reliability signal DR.

Figure 2:
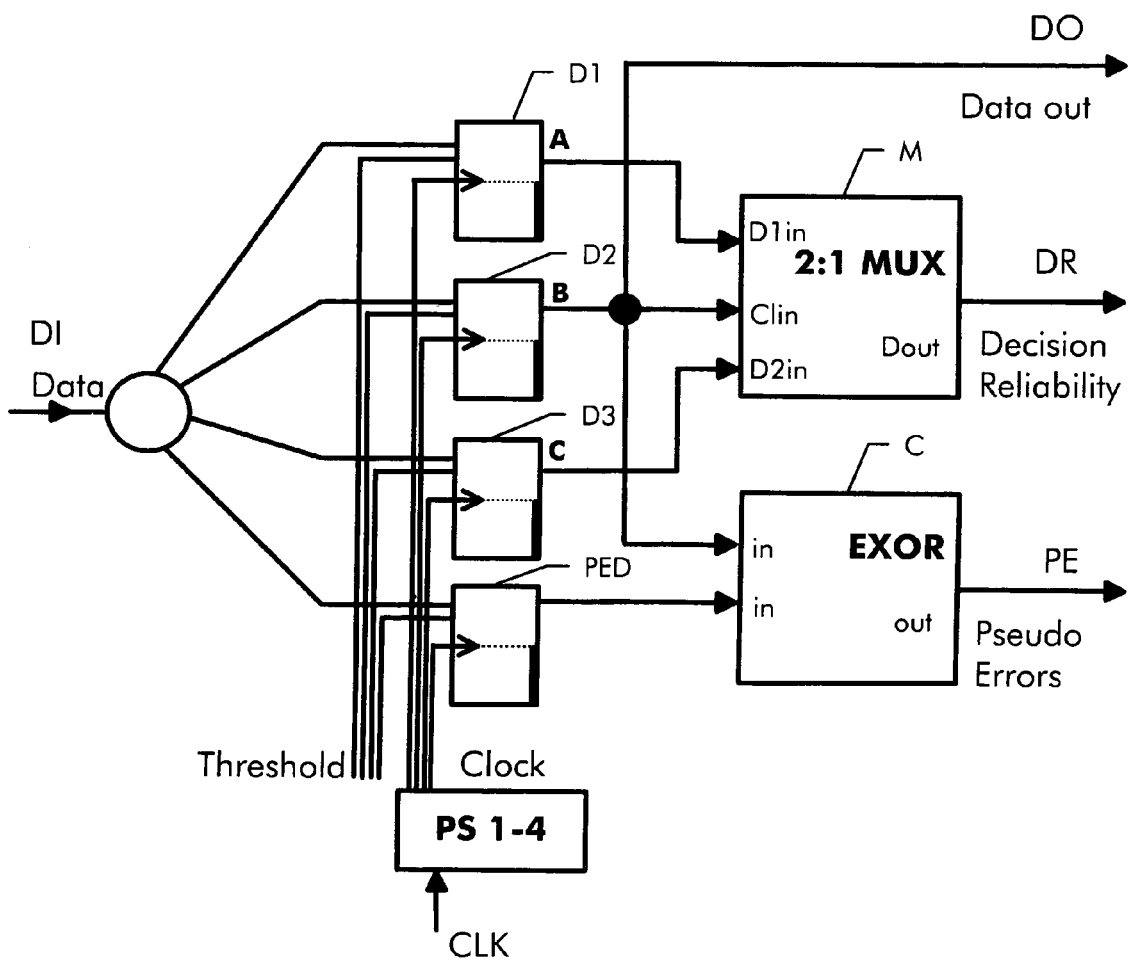
FIG. 2 shows a circuit diagram of a second decision circuit according to the present invention.

A second embodiment of the present invention is shown as a circuit diagram in FIG. 2. Same elements are depicted with the same reference signs as in FIG. 1.

The 2:1 multiplexer M has two data inputs D1in and D2in, a clock input Clin, and a data output Dout. Output of decider D1 is coupled to D1in, output of decider D3 is coupled to D2in and output of decider D2 is coupled to Clin. Dout represents the reliability signal DR and output of D2 it the data output DO.

Figure 3:
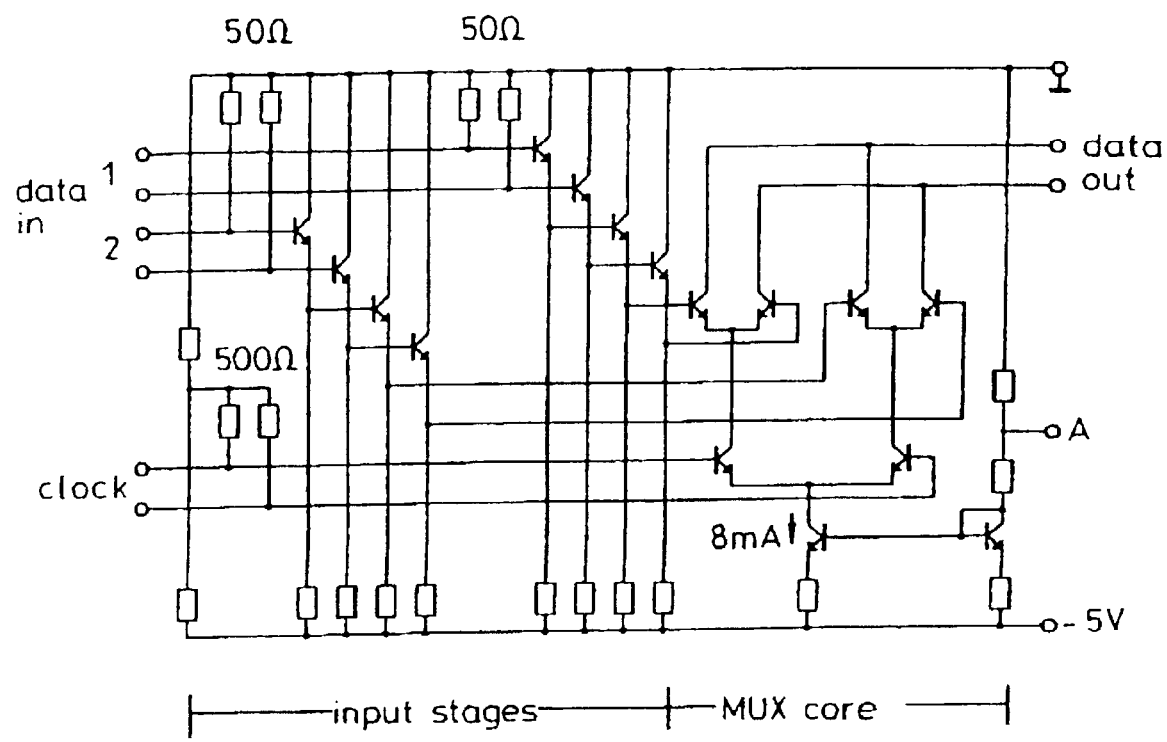
FIG. 3 shows a known 2:1 multiplexer which can be used in the decision circuit of FIG. 2.

A multiplexer that is well suited to be used in the decider circuit of FIG. 2 is shown in FIG. 3. This multiplexer circuit as such is known from the article "Demonstration of Retiming Capability of Silicon Bipolar Time-Division Multiplexer Operating to 24 Gbit/s" of J. Hauenschild et al., Electronics Letters vol.27, No.11, pp.978-979, 23$^{rd}$ May 1991, which is incorporated by reference herein. This multiplexer has the advantage that it can be fully integrated in SiGe bipolar chips for use at very high bitrate of 20 Gbit and above. However, the invention is not limited to this particular multiplexer but can make use of any 2:1 multiplexer known in the art.

However, the multiplexer M is defined by the logical operation on the output signals of the three deciders D1-D3 and can thus also consist of logic circuits like EXORs which logically combine the output signals of the three deciders in a way to achieve the same logical operation as explained above.

The reliability signal DR serves as a means to decide how reliable the decision of the decider circuit is. It may be evaluated by some logic circuit like counters or a programmable processor (not shown) to determine line or equipment failures in the transmission path. If the reliability signal DR has the value 1, the decision reliability is high, if the signal value is 0, the reliability is low. The number of 0s in a defined time interval may be counted and if the number exceeds a predetermined threshold, an alarm like "loss of signal" or AIS may be generated. The counter is reset each time the time interval lapses and starts counting again. Occasional 0s in the reliability signal may be ignored.

Preferably, the count value of 0s in DR is compared to performance monitoring data, which are computed by some error check performed during signal processing in subsequent parts of a receiver. Such performance monitoring data indicate check sum errors detected in the signal and if these errors correlate with a low reliability of the decision process, this indicates a failure in preceding equipment on the transmission path.

A further advantageous development of the invention is also shown in FIG. 2. The improvement consists of a pseudo-error monitor that is used to adjust the threshold values of the deciders D1-D3 or the clock phases of the clock signal supplied to the deciders or both. A pseudo-error monitor is as such known from EP 0 923 204, which is incorporated by reference herein.

For pseudo-error generation, a fourth decider PED is coupled to the data input DI. It has a threshold value which lies preferably between the threshold values of either deciders D2 and D1 or deciders D2 and D3. Decider PED is also supplied with a recovered clock signal. The output of decider PED feeds to a first input of a logical EXOR gate C. A second input of EXOR gate C is coupled to data output DO. The output of EXOR gate C represents a pseudo-error signal that is evaluated according to predefined rules by some logic circuit like a programmable processor (not shown). Such rules are determined based on signal and transmission properties or may be empirically determined. However, the evaluation of the pseudo-errors is used to adjust the threshold values of some or all of the four deciders D1-D3, PED or the phases of some or all of the clock signals supplied to the four deciders D1-D3, PED or both. Phase adjustment is achieved using conventional phase shifters PS1-4.

Adjustment of thresholds and phases yields in an improved detection with respect to rate and reliability. The rules may therefore be determined in a training phase in such a way as to optimize the detection quality. A logic circuit which is especially suited for such training is a neural network type processor logic.

The decision circuit is part of a receiver for high bitrate binary signals. The receiver may have further to the decision circuit other elements like O/E converter, line termination and signal evaluation equipment as is commonly known in the art.

What is claimed is:

1. A receiver for high bitrate binary signals, said receiver comprising:
    three deciders coupled in parallel to a data input, each of the deciders having a different threshold value for deciding whether the received signal is above a respective threshold value;
    a 2:1 multiplexer coupled to said three deciders for generating a reliability signal from the output signals of said deciders;
    a first output signal line connected to one of said deciders or to said multiplexer for outputting a binary data output signal; and
    a second output signal line connected to said multiplexer for outputting the reliability signal,
    wherein the reliability signal is indicative of the reliability of the output binary signal.

2. A receiver according to claim 1, further comprising a clock generator coupled to the data input for generating a recovered clock signal from said input signal, said recovered clock signal being supplied to clock inputs of said deciders.

3. A receiver according to claim 1, further comprising a pseudo-error monitor used for adjusting one or more of the threshold values of the deciders.

4. A receiver according to claim 3, wherein the pseudo-error monitor comprises a fourth decider feeding to an EXOR gate, said EXOR gate being further supplied with said output binary signal for generating pseudo-errors, said pseudo-error being evaluated by a logic circuit to adjust said threshold values.

5. A receiver according to claim 2, further comprising a pseudo-error monitor used for adjusting the clock phases of the clock supply of one or more of the deciders.

6. A receiver according to claim 5, wherein the pseudo-error monitor comprises a fourth decider feeding to an EXOR gate, said EXOR gate being further supplied with said output binary signal for generating pseudo-errors, said pseudo-error being evaluated by a logic circuit to adjust said clock phases.

7. A decider circuit for high bitrate binary signals, said decider circuit comprising:
    three deciders coupled in parallel to a data input, each of the deciders having a different threshold value for deciding whether the received signal is above a respective threshold value;
    a 2:1 multiplexer coupled to said three deciders for generating a reliability signal from the output signals of said deciders;
    a first output signal line connected to one of said deciders or to said multiplexer for outputting a binary output signal; and
    a second output signal line connected to said multiplexer for outputting the reliability signal.

8. A method of recovering a high bitrate binary signals, comprising:
    comparing the received signal with three different threshold values, thereby obtaining four possible states;
    decoding the four possible states into a two bit signal, the most significant bit representing the recovered signal and the least significant bit being a reliability signal; and
    outputting from the decoder a first signal as the recovered signal and a second signal as the reliability signal.
    wherein the least significant bit is indicative of the reliability of the recovered signal.

* * * * *